Oct. 4, 1938.    R. STEVENSON    2,131,788
THREAD SHEAR
Filed March 5, 1936    3 Sheets-Sheet 1

Inventor
Robert Stevenson
By Thomas A. Jenckes
Attorney

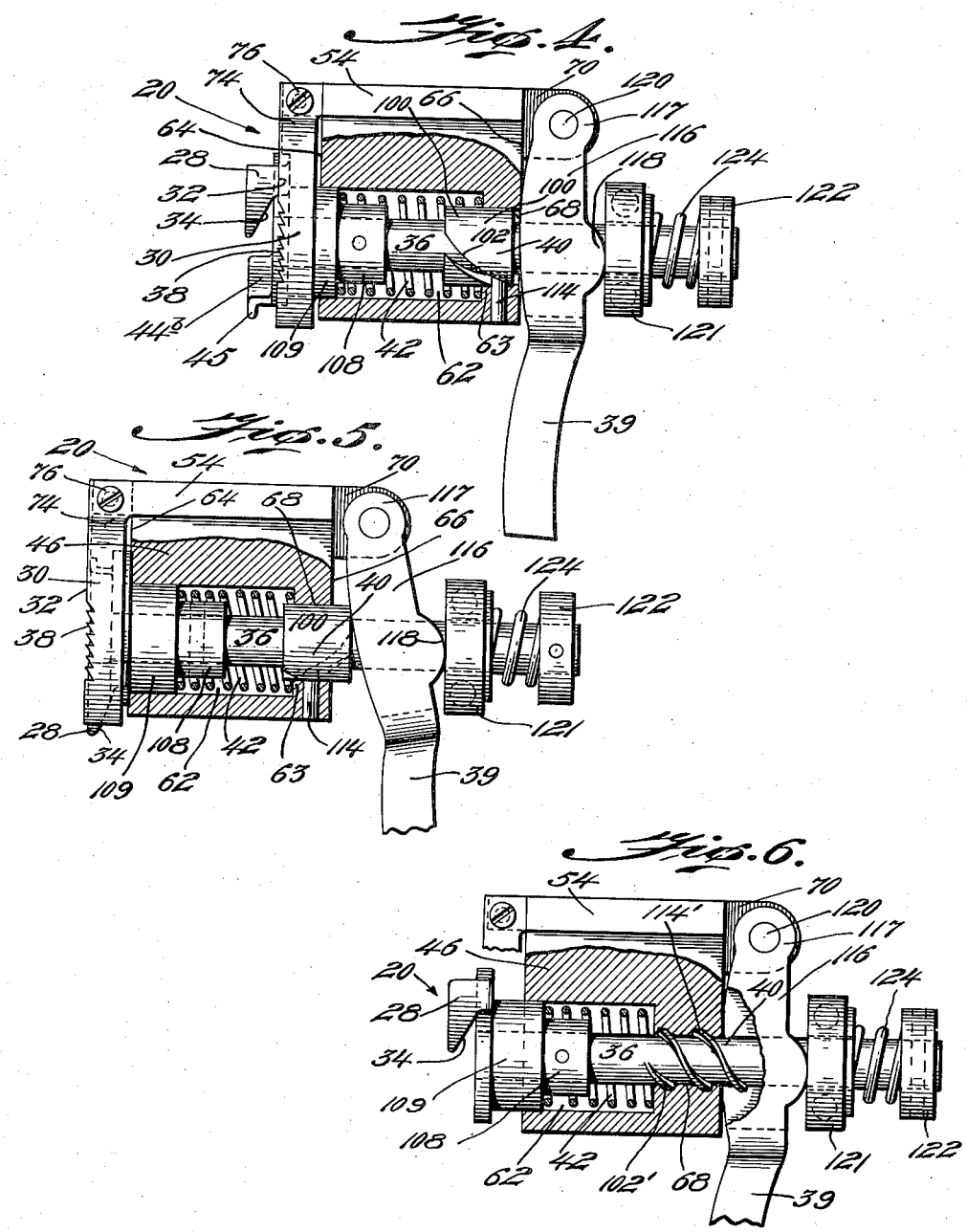

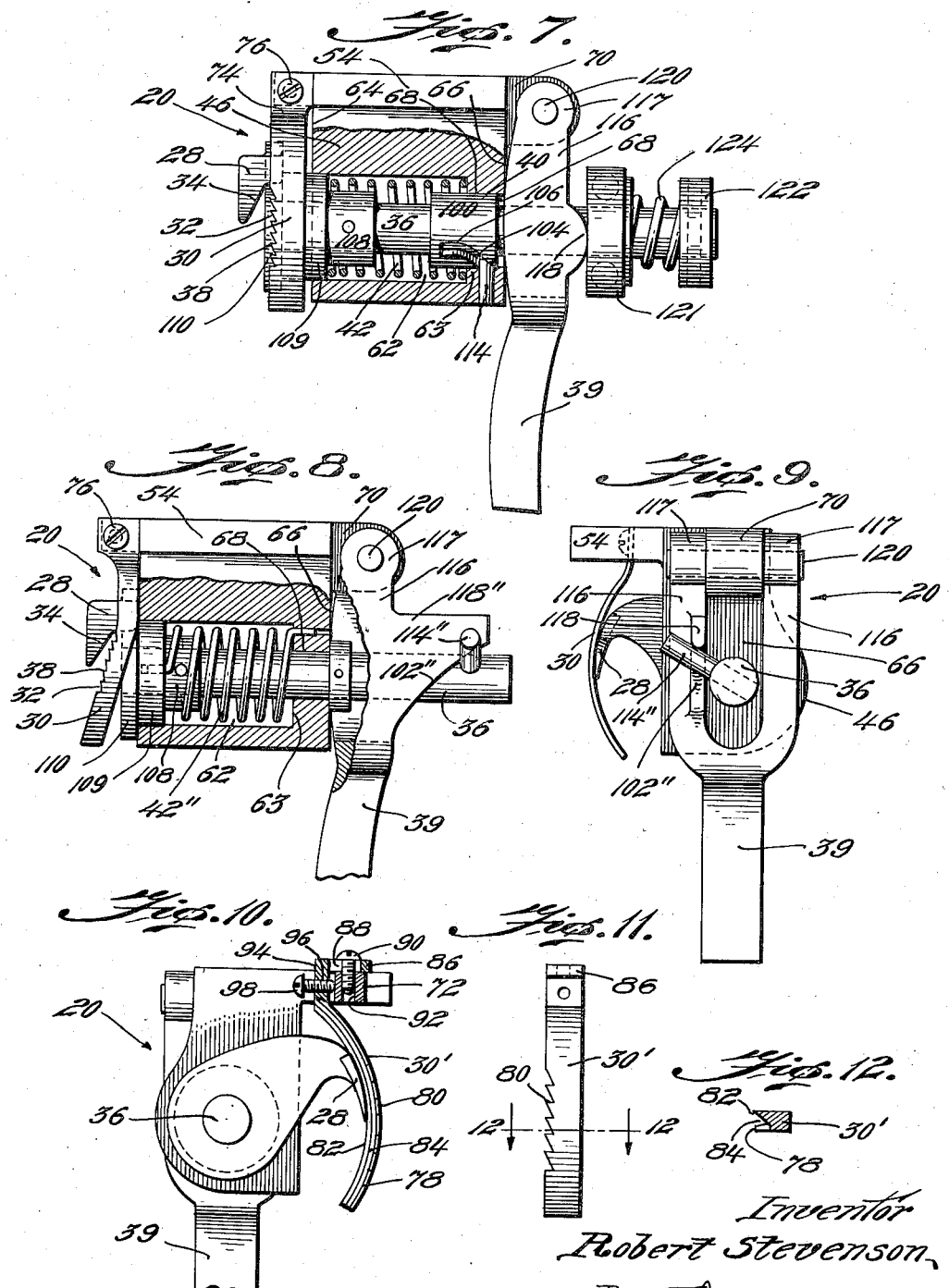

Patented Oct. 4, 1938

2,131,788

UNITED STATES PATENT OFFICE 2,131,788

THREAD SHEAR

Robert Stevenson, West Barrington, R. I., assignor to Mechanical Holding Corporation, Providence, R. I., a corporation of Rhode Island Application March 5, 1936, Serial No. 67,312

20 Claims. (Cl. 139—303)

My invention relates to improvements in weft thread cutters or shears and in my preferred embodiment comprises an attachment for mounting adjacent a temple to function to shear the laid weft immediately adjacent the temple on the forward movement of the lay.

One object of my invention is to provide a sharper, quicker and more efficient shearing action than any hitherto provided and a construction which may be readily attached to a temple to function to shear the weft thread nearer the edge of the warp and closer to the temple than former constructions.

A further object of my invention is to provide a weft shear which may be readily detached from the temple when its use is not required.

A cutting action may be defined as a stamping action, wherein a blade functions against a base parallel thereto to cut the thread. A shearing action may be defined as the action of scissors, where one cutting blade moves towards the other at an angle. In the prior art some of the constructions have provided a cutting action and others a single shearing action.

An object of my invention is to provide a weft cutter which functions to provide a shearing action in one plane or direction and a supplemental shearing and preferably gathering action in a plane or direction at an angle thereto, in my preferred embodiment, preferably at a right angle or normal thereto. By providing a shearing action in two directions at an angle to each other, I provide a quicker and more efficient shearing action than that provided in the devices in the prior art.

It is also well known as by cutting a sheet of paper held vertically with a knife that a more rapid stroke will cut more quickly, cleanly and efficiently than a slower stroke. Most of the prior art structures have functioned on a leverage principle to cut the thread at a point substantially near the fulcrum of the movable knife with a very small velocity. A further object of my invention is to provide a knife blade which will function in its cutting action at a considerable distance from its fulcrum, thereby providing a greater relative velocity to the blade, and hence cleaner and more efficient cutting action than provided by prior art structures.

A further object of my invention is to provide by a simultaneous relative movement between the blades in two directions at an angle to each other and by the provision of a preferably serrated shearing edge in one blade, of a gathering movement into a serration in one direction in supplement to the shearing relative movement of the blade in the same direction and further features of my invention relate to the provision of supplemental means to assist in gathering the thread between the blades or in the serrations of such a serrated blade prior to the actual shearing operation.

A further object of my invention relates to structural advantages of strength, adjustability, detachability, etc., of the preferred structures shown.

These and such other objects of my invention as may hereinafter appear will be best understood from a description of the accompanying drawings, which illustrate various embodiments thereof.

In the drawings, Fig. 1 is a perspective view of my improved weft shear mounted on a temple adjacent the warp edge in position to shear a recently laid weft thread.

Fig. 4 is a side elevation of my improved weft thread shear with the housing shown in section to show in elevation the parts contained therein.

Fig. 5 is a view similar to Fig. 4 showing my invention at the completion of its shearing stroke.

Fig. 6 is a view similar to Fig. 4 showing my preferred type of threaded motion transmitting and translation means.

Fig. 7 is a view similar to Figs. 4 and 6 showing a different type of motion transmitting means capable of causing an initial relative partial rotation of the moveable shearing thread blade to the stationary shearing blade thereof and then a forward axial movement thereof to achieve the shearing action.

Fig. 8 is a view similar to Figs. 4, 6 and 7 of a further embodiment of my invention in which the stationary blade is preferably arranged at an angle to the vertical and in which a rotary movement only of the movable blade is transmitted.

Fig. 9 is a front elevation of the embodiment of my invention shown in Fig. 8.

Fig. 10 is a rear elevation of my invention employing an adjustable stationary shearing blade of a different species from that hitherto shown.

Fig. 11 is a side elevation of the stationary shearing blade shown in Fig. 10.

Fig. 12 is a sectional view taken along the line 12—12 of Fig. 11.

In the drawings, wherein like characters of reference indicate like parts throughout, 20 generally indicates a weft thread shear constructed in accordance with my invention.

Figure 1:
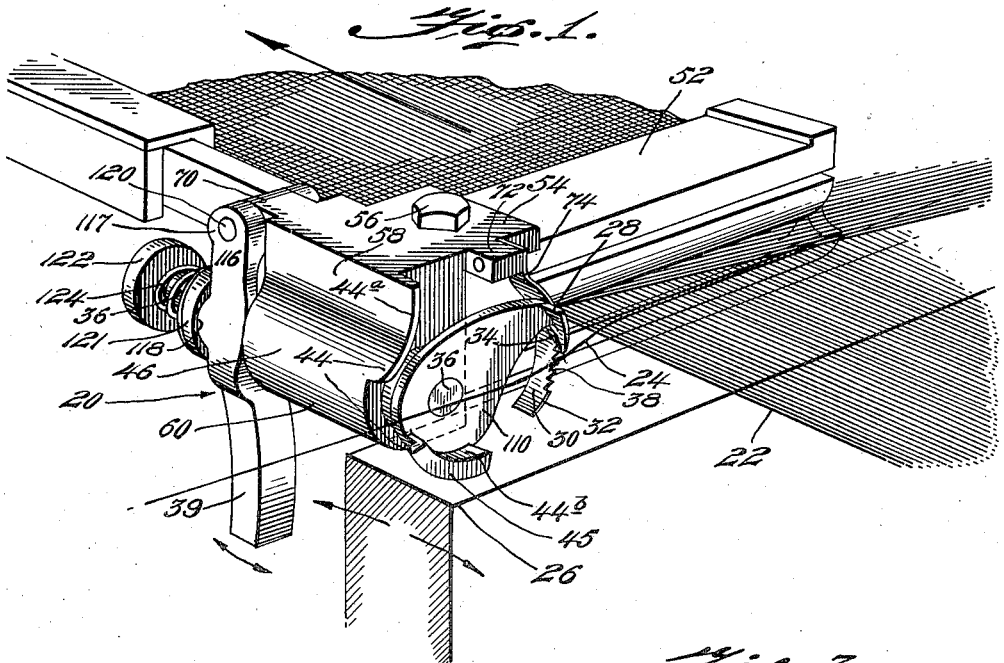

My improved weft shear is adapted for use adjacent a warp edge 22 for shearing the end of the laid weft 24 on the forward movement of the lay 26 and comprises a pair of shearing blades 28 and 30 mounted adjacent the warp edge 22 and immediately adjacent and at an angle, preferably at a right angle or normal to the laid weft thread 24 and means adapted to be actuated by the forward movement of the lay to relatively move said shearing blades in shearing relation in a direction at an angle, preferably at a right angle or normal to the laid weft thread and also preferably in another direction at an angle preferably at a right angle or normal thereto across said thread and partially past each other to shear said thread. In the preferred embodiment of my invention, I preferably mount my improved pair of shearing blades 28 and 30 so that they may remain in use continuously at the same angle during the entire shearing operation. In the true scissor type of shears, it is obvious that the relative movement of the two shearing blades will cause the angle between them to diminish until the shearing edges finally become parallel. In the preferred embodiment of my invention, however, the shearing blades are adapted to remain in use at substantially the same angle relative to each other so that a shearing action may always take place on a relative movement in one direction, and a double shearing action will take place on a supplemental movement in a direction at an angle to the direction of the first movement and for this purpose I preferably provide the shearing blade 30 with a straight shearing edge 32 and the shearing blade 28 with a shearing edge 34 arranged to always remain in use at an angle thereto, in my preferred embodiment the shearing edge 32 being arranged in a vertical position and the shearing edge 34 being arranged at an angle to the vertical and it will be thus apparent that on relative movement of the shearing edges 32 and 34 in a vertical direction or plane a shearing action will take place and that on a supplemental relative movement in a horizontal direction or plane or other direction or plane at an angle relative thereto a supplemental shearing action will take place and that one of said relative movements may also cause a supplemental gathering action of the weft thread 24 to be sheared between said edges 32 and 34. I also provide means to be actuated by the forward movement of the lay to relatively move said shear blades to cause the shearing edges to relatively pass across said thread, (1) in a direction at an angle preferably at right angles or normal to the laid weft thread and (2) in another direction at an angle preferably at a right angle or normal relative thereto. As stated hitherto, I also preferably space the relatively movable shearing blade 28 at a substantial distance from its pivot 36 so as to provide a movement of substantial distance of the shearing edge 34 thereof across the thread 24 with substantial velocity to cause a sharp shearing action. In the preferred embodiment shown one of said shearing edges preferably the straight edge 32 is serrated as at 38.

While I preferably move the shearing edges 32 and 34 in two directions at an angle to each other, it is apparent that inasmuch as one shearing edge, namely, the edge 34 shown is arranged to be continuously angularly inclined at the same angle relative to the other edge 32, the vertically mounted or serrated edge shown, it is obvious that with this construction a shearing movement is bound to take place, either on movement of the inclined edge 34 in a downward direction relative to the straight edge 32, or in a horizontal direction relative to the straight edge 32 and I have shown in Fig. 7 an embodiment capable of substantially providing a shearing action on a relatively horizontal movement only and in Fig. 8 an embodiment capable of providing a shearing action on a relatively vertical movement of said blades only.

In the preferred embodiment shown, I preferably supply the relative vertical movement of the shearing edges 32 and 34 by a rotative movement of the movable shearing edge 34 and the horizontal movement by an axial or horizontal movement of the shearing edge 34 and I provide means such as the arm 39 projecting downwardly from my device 20 adapted to be actuated on said forward movement of the lay and means 40 to translate and transmit the forward movement of the actuating arm 39 into a longitudinally or axially forwardly slidable movement of the shearing blade 34 and also into a rotatable or downward movement of said shearing blade 34. While I prefer the action of two movements at once, to provide the double shearing action hitherto mentioned, it is obvious that said movement may be translated into a substantially axial movement only, as shown in Fig. 7, or a substantially rotative movement only, as shown in Fig. 8. As usual in devices of this type, means, preferably spring means 42 may be provided to return the shearing edge 34 to starting position and means 44 also may be provided to assist in gathering and gripping the weft thread 24 into a serration of the opposed shearing edge prior to final shearing movement of the movable shearing edge.

In my preferred embodiment shown, my improved weft shear includes an elongated housing 40 46 having a flat inner surface 48 for abutting the outer wall 50 of a temple head 52 and a lip 54 projecting laterally from the inner portion of the top thereof adapted to overlie the inner end of the temple head 52 and be secured thereto by the threaded screw 56. Said housing 46 also has an outer surface having a flat upper portion 58 and a cylindrical lower portion 60, a cylindrical hollow portion 62 extending from the rear wall 64 of the housing 46 substantially to the front wall 66 in said cylindrical lower housing portion 60 and a cylindrical connecting hollow bearing portion 68 of less diameter extending through said front wall 66. Said housing 46 also has a gathering lip 44ª forming a portion of the gathering means 44 extending rearwardly upwards from substantially the center of the cylindrical portion 60 on the outer edge thereof and a pivot lug 70 projecting forwardly from the top wall thereof substantially centrally above said hollow cylindrical bearing portion 68 and a lug 72 projecting rearwardly therefrom beyond the rear edge of the temple head 52. The stationary shearing blade 30 is provided with an upper end 74 secured by means of the screw 76 to the inner edge of the forwardly projecting housing lug 72 and a partially cylindrical body portion 30 extending inwardly and downwardly substantially concentric with said cylindrical hollow portion 62 and having a rear face or shearing edge 32, which is preferably provided with the serrations 38. This may not only take the form of a thin blade as in the embodiment shown in Figs. 1–9, but may take the form of a thickened blade 30' as shown in Figs. 10 and 11, in which the inner surface of the rear face 78 is provided with a serrated edge 80 and the outer surface is provided with a shearing edge 82 and a groove 84 is provided between the serrated edge 78 and shearing edge 82. I have also shown in Fig. 10 a shearing blade 30' which may be adjustably mounted relative to the movable blade 28 and for this purpose the upper end of the blade 30' is provided with a lug 86 projecting inwardly therefrom having a longitudinal slot 88 therein. A screw 90 is also provided adapted to extend through said slot 88 and into the threaded vertical hole 92 in the lug 72. The outer face 94 of the upper end of the blade 30' is provided with a hole 96 adapted to receive a screw 98 therein to abut the outer surface of the lug 72. It is thus obvious by unscrewing the screw 90 and screwing the screw 98 adjustable amounts that the distances of the stationary blade 30' from the movable blade 28 may be adjustably varied, and that when the desired relative position of the blade 30' has been attained the locking screw 90 may be tightened to rigidly secure the blade 30' to the lug 72.

To provide the pivot 36 for said movable blade 28, I provide the shaft 36 longitudinally slidable and rotatably mounted within the housing 46. Said shaft 36 also cooperates to assist in providing the means 40 for transmitting and translating forward movement of the actuating arm 39 into rotative and/or longitudinal movement of the movable blade 28 mounted on said shaft. In the embodiment of my invention shown in Figs. 1–5 and 7 I provide a collar 100 rigidly secured to and preferably as shown integral with the center portion of the shaft 36 and slidable within the cylindrical hollow bearing portion 68 in the front end of the housing 46 and provided with a helical cam way 102 therein. In the embodiment shown in Fig. 7, the cam way 102 extends first helically as at 104 and then straight rearwardly as at 106 to give, in a manner to be explained, an initial sliding and rotative movement of the shaft 36 and shearing blade 28 for gathering purposes and then a straight axial movement thereof for shearing purposes.

Figures 2, 3:
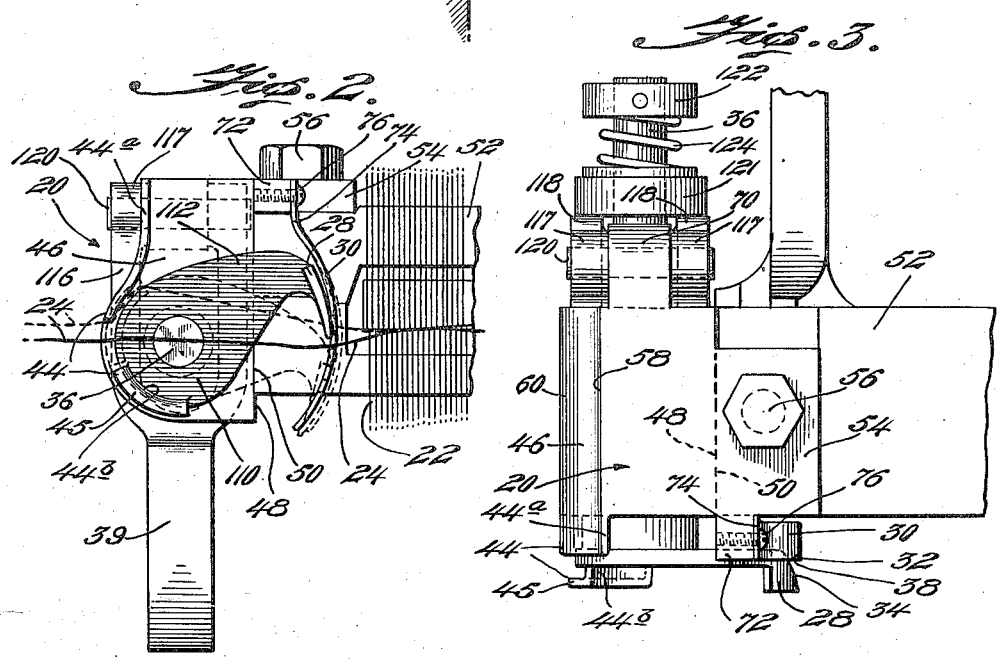
Fig. 2 is a rear elevation of my improved weft shear about to shear a recently laid weft thread.
Fig. 3 is a plan view of my improved weft shear mounted on the end of a temple.

I also provide a collar 108 rigidly mounted on the rear end of said shaft to revolve within the rear end of said cylindrical hollow housing portion 62 and to slide axially therein. The rear end of said collar 108 is preferably, as shown in Figs. 1 and 2 provided with an enlarged disc 110 provided with the arm 112 projecting radially outwardly therefrom towards the warp and of a radius substantially equal to that of said partially cylindrical stationary shearing member and terminating at its inner end in the also partially cylindrical movable shearing blade 28 bent at right angles thereto adapted to oscillate downwards substantially adjacent to said stationary serrated, also partially cylindrical shearing blade 30. In the embodiments shown in Figs. 1–9, the stationary shearing blade is preferably flexible and while of substantially similar partially cylindrical construction is mounted slightly eccentrically of the shaft 36 to bear at all times with pressure against the movable blade 28. As shown in Fig. 1 at the start of its movement the disc 110 is spaced a substantial distance from the rear end of the housing 46 and it is obvious that after use the disc 110 abutting the rear edge of the housing 46 will tend to limit the axial sliding movement of said disc 110, shearing edge 34 and shaft 36. As previously explained, the shearing edge 34 is preferably inclined upwardly from the rear to front towards the stationary shearing edge 32.

In the embodiment shown in Figs. 1–5 and 7 the means 40 to translate and transmit forward movement of the actuating arm 39 into rotative and axial sliding movement of the pivot shaft 36 also includes a male member or pin 114 projecting radially inwardly from said housing into said hollow bearing portion 68 adapted to slide in the cam way 102. In my preferred embodiment shown in Fig. 6, as another portion of said means 40 to transmit and translate forward movement of the arm 39 into a rotative and forwardly axial movement of the shaft 36 and movable shearing blade 34, I provide the thread 102' struck up from the portion of the shaft 36 adjacent the hollow bearing portion 68 of the housing and I provide a cooperating thread 114' internally cut within said bearing portion 68. As stated, I also preferably provide means 42, preferably spring means, mounted within the housing 46 to return said shaft and movable shearing edge 34 to starting position. In my preferred embodiment in order that said means may readily function, I construct my transmitting means 40 of readily reversible construction and hence provide the helical cam way 102 of a substantially large pitch angle and the threads 102' and 114' of correspondingly large pitch angle, preferably for two reasons to be described, somewhat near a 45° pitch angle, both for (1) ease of axial movement and ease of spring return and (2) if the shearing edge 34 be inclined at approximately 45° to give a net movement of approximately 45° of said shearing edge 34 composed of the sum of its axial and rotative movements.

As shown in Fig. 8, I may transmit and translate the forward movement of the arm 39 into a purely rotary movement of the shaft 36 and shearing edge 34, in which instance the translation means are further modified in a manner to be described and in which instance for more efficient shearing, the stationary shearing edge 32 is preferably mounted, as shown in Fig. 8 at an angle to the vertical so that a gathering and shearing action of the thread may take place on a plain rotative movement of the shaft 36.

I provide on the upper end of the arm 39, the yoke arms 116 terminating in pivot ears 117 at the upper end of the yoke portions thereof provided with suitable holes to receive the pivot pin 120 extending through a suitable transverse hole in the pivot lug 70. Said arms 116 are adapted to straddle the shaft 36 to permit relative sliding thereof therebetween and are provided with rear edges preferably extended centrally into the protuberances 118 for a purpose to be described. Said actuating arm 39 terminates in the lower end normally mounted in the path of said movement of the lay. In the embodiment shown in Figs. 1–7 a collar 121 is slidably mounted on the front end of the shaft to abut the said extensions 118 of the yoke arm 39, whereby on forward movement of said yoke arm said extensions 118 may abut said slidable collar 121 to urge said slidable collar and shaft forwardly to cause through the operation of the male elements 114 cooperating with the female elements 102, a rotation of the shaft 36 and movable shearing blade 28 and/or a supplemental axial movement thereof. It is thus obvious that these cooperating elements function to provide a rotative movement of the shaft 36 at the same time permitting if desired, an axial forward movement thereof. In the embodiment shown in Fig. 7, as stated, the cam way 104 only permits a slight rotative movement and the portion 106 permits a straight axial movement. In the embodiments shown in Figs. 1–7, a stationary collar 122 is mounted on the front end of the shaft 36 and a buffer spring 124 is provided having one end thereof abutting the stationary collar 122 and the other end thereof abutting the slidable collar 121. In the embodiment shown in Fig. 8, I provide a device wherein the entire forward movement of the arm 39 is transmitted and translated into a purely rotary movement of the shaft 36 and in this instance the means 40 for this purpose comprise the male member 114" on he rear end of the shaft 36 adapted to function against the inclined cam 102" forming the lower edge of a forward extension 118' of a yoke arm 116.

As also stated, I provide means mounted within the housing 46 to return the shaft 36 and movable shearing edge 34 to starting position and in my preferred embodiment shown in Figs. 1–7, said means comprises the spring 42 mounted within the housing having one end thereof adapted to abut an enlarged rear portion 109 of the collar 108 and the other end thereof adapted to abut the front edge of the hollow cylindrical portion 62, namely, the annular shoulder 63 formed exterior of the hollow bearing portion 68 of smaller diameter in the front of said housing. Due to the reversibility of the transmission means 40 provided, namely, the screw shown in Fig. 6 and the pin and cam way shown in Figs. 1–5 and 7, a straight expansion spring 42 is entirely suitable for this purpose. In the embodiment shown in Fig. 8, however, a helical torsion spring 42" is necessary in order to rotate the shaft 36 back to its starting position and in this embodiment the helical torsion spring 42" has one end thereof embedded within the enlargement 109 of the collar 108 and the other end thereof embedded within said annular shoulder 63 formed by the front edge of the hollow bearing portion 62.

As stated, I also provide means to assist in gathering and gripping the weft thread 24 into one of the serrations 38 of the stationary shearing edge 32 prior to final shearing movement of said movable shearing edge 34 which said means includes the extension or lip 44ª hitherto described and the lip 44ᵇ projecting arcuately rearwardly from the outer edge of the lower end of the disc 110, starting when the blade 28 is in raised position at a point substantially immediately below said shaft 36 and extending upwardly throughout substantially a quarter circle and terminating in an outer edge 45 projecting radially outwardly therefrom adapted to entrain the thread 34 and gently compress it against the lip 44ª on rotation of the shaft 36 as shown in dotted lines in Fig. 2. Thus in use it is apparent that forward movement of the arm 39 on the forward movement of the lay will cause the projections 118 thereof to abut the collar 121 and through the medium of the buffer spring 124 functioning against the collar 122, urge the shaft 36 axially forwardly and the pin 114 riding in the cam way 102 will simultaneously function to translate a moment of this force into rotative movement of the shaft 36 in the embodiment shown in Figs. 1–5. In the embodiment shown in Fig. 7, it is apparent that there will only be a slight initial rotative movement and that the then straight cam portion 106 will permit a true axial movement of the shaft 36. It is also apparent that in the embodiment shown in Fig. 6, the cooperating male and female screw means 102' and 114' will function to translate and transmit substantially equal rotative and forward axial movements of the shaft 36 and shearing blade 28 to cause not only a shearing action of the inclined shearing edge 34' relative to the straight edge 32 on the rotative movement thereof, but also a supplemental shearing action on the axial movement thereof and a single shearing action if either a single axial movement as shown in Fig. 7, or a single rotary movement as shown in Fig. 8 be employed. In the embodiment shown in Fig. 8, it is obvious that the pin 114" riding along the cam 106 will transmit a rotary movement only to the shaft 36 and movable shearing blade 34.

It is also obvious that the lip 44ᵇ including the projection 45 thereof will confine the thread 24 against the lip 44ª to assist in tending to draw the thread upwardly to the high portion of the inclined edge 34 and forwardly into a serration 38 if the serrated shearing edge 32 be employed, or flatly against a straight unserrated shearing edge.

It is also apparent that as the lay starts its rearward movement the spring 42 will function to expand to again urge the collar 108 rearwardly, causing rearward movement of the shearing blade 34 and/or upward movement thereof in accordance with the constructions of the transmitting and translating means of the various embodiments heretofore described.

It is thus apparent that I have provided a novel type of weft shear providing also a gathering relative action between the movable and serrated edges and if desired with a double shearing action, with the advantages hitherto explained.

It is understood that my invention is not limited to the specific embodiments shown and that various deviations may be made therefrom without departing from the spirit and scope of the appended claims.

What I claim is:

1. A weft shear for a loom having a lay for use adjacent a warp edge for shearing the laid weft thread on the forward movement of said lay, comprising a pair of shear blades having shearing edges mounted adjacent the warp edge and immediately adjacent and at an angle to the laid weft thread and means arranged to be actuated by the forward movement of said lay to relatively and simultaneously move said shear blades in shearing relation in a single direction at an angle to the laid weft thread and in another single direction at an angle to said first direction across said thread to shear said thread in both said directions.

2. A weft shear for use in a loom having a lay and positioned adjacent a warp edge for shearing the laid weft thread on the forward movement of said lay, comprising a pair of shear blades having shearing edges adjacent the warp edge and immediately adjacent and at an angle to and on different sides of the laid weft thread, one of said blades being movable across said laid weft thread relatively past the other, and one of said blades having a serrated shearing edge and one of said blades being arranged to be continuously inclined at the same angle relative to the other blade in use and means arranged to be actuated by said lay and connected with said movable blade to move rapidly said movable blade at a constant angle simultaneously in one direction at an angle to said weft thread and in another direction at an angle to said first direction across said thread and other blade to cause a shearing action in both said directions, the relative movement in one direction supplementally causing a gathering action of the thread towards the other blade.

3. A weft shear for use in a loom having a lay and positioned adjacent a warp edge for shearing the laid weft thread on the forward movement of said lay, comprising a pair of shear blades having shearing edges adjacent the warp edge and immediately adjacent and at an angle to and on different sides of the laid weft thread, one of said blades being movable across said laid weft thread relatively past the other and one of said blades being arranged to be continuously inclined at the same angle relative to the other blade in use and means arranged to be actuated by said lay and connected with said movable blade to move said movable blade at a constant angle simultaneously in one direction at an angle to said weft thread and in another direction at an angle to said first direction across said thread and other blade to cause a shearing action in both said directions.

4. A weft shear for use in a loom having a lay and positioned adjacent a warp edge for shearing the laid weft thread on the forward movement of said lay, comprising a pair of shear blades having shearing edges adjacent the warp edge and immediately adjacent and at an angle to and on different sides of the laid weft thread, one of said blades being movable across said laid weft thread relatively past the other and one of said blades being arranged to be continuously inclined at the same angle relative to the other blade in use and means arranged to be actuated by said lay and connected with said movable blade to move said movable blade at a constant angle in one direction across said thread and other blade to cause a shearing action in said direction, and means actuated by said means for gathering and gripping the weft threads against said stationary shearing edge prior to final shearing movement of said movable shearing edge.

5. A weft shear for use in a loom having a lay and positioned adjacent a warp edge for shearing the laid weft thread on the forward movement of said lay, comprising a pair of shear blades having shearing edges adjacent the warp edge and immediately adjacent and at an angle to and on different sides of the laid weft thread, one of said blades being movable across said laid weft thread relatively past the other, and one of said blades having a serrated shearing edge and one of said blades being arranged to be continuously inclined at the same angle relative to the other blade in use and means arranged to be actuated by said lay and connected with said movable blade to move said movable blade at a constant angle simultaneously in one direction at an angle to said weft thread and in another direction at an angle to said first direction across said thread and other blade to cause a shearing action in both said directions.

6. A weft shear for use in a loom having a lay and positioned adjacent a warp edge for shearing the laid weft thread on the forward movement of said lay, comprising a pair of shear blades having shearing edges adjacent the warp edge and immediately adjacent and normal to and on different sides of the laid weft thread, one of said blades being movable across said laid weft thread relatively past the other and one of said blades being arranged to be continuously inclined at the same angle relative to the other blade in use and means arranged to be actuated by said lay and connected with said movable blade to move rapidly said movable blade at a constant angle simultaneously in one direction at an angle to said weft thread and in another direction normal to said first direction across said thread and other blade to cause a shearing action in both said directions.

7. A weft shear for use in a loom having a lay and positioned adjacent a warp edge for shearing the laid weft thread on the forward movement of said lay, comprising a pair of shear blades having shearing edges adjacent the warp edge and immediately adjacent and normal to and on different sides of the laid weft thread, one of said blades being movable across said laid weft thread relatively past the other, and one of said blades having a serrated shearing edge and one of said blades being arranged to be continuously inclined at the same angle relative to the other blade in use and means arranged to be actuated by said lay and connected with said movable blade to move said movable blade at a constant angle simultaneously in one direction at an angle to said weft thread and in another direction normal to said first direction across said thread and other blade to cause a shearing action in both said directions, the relative movement in one direction supplementally causing a gathering action of the thread towards the serrated blade.

8. A weft shear for use in a loom having a lay and positioned adjacent a warp edge for shearing the laid weft thread on the forward movement of said lay, comprising a pair of shear blades having shearing edges adjacent the warp edge and immediately adjacent and at an angle to and on different sides of the laid weft thread, one of said blades being movable across said laid weft thread relatively past the other, and means arranged to be actuated by said lay and connected with said movable blade to move rapidly said movable blade at a constant angle simultaneously in one direction normal to said weft thread and in another direction normal to said first direction across said thread and other blade to cause a shearing action in both said directions.

9. A weft shear for a loom having a lay and a temple having a head comprising a housing adapted to be secured to and abut the outer end of said temple head, a shaft axially slidably and rotatably mounted within said housing, a movable shearing member mounted on the rear end of said shaft, comprising a disc spaced in inoperative position a distance from the housing rear end and having an arm projecting radially outwardly therefrom terminating at a substantial distance from said shaft in a partially cylindrical shearing end bent at right angles rearwardly from the end thereof and having a shearing edge on the lower surface thereof inclined upwardly from rear to front, a partially cylindrical shearing member of substantially equal radius rigidly adjustably mounted on said housing relative to said movable shearing edge having an aligned serrated rear shearing edge of substantially the radius of and immediately inside of said movable shearing edge and substantially adjacent the temple head rear edge and the edge of the warp and in front of and normal to the path of the weft, an actuating arm having an upper end pivotally mounted on the front end of said housing, a center portion engaging said shaft and a lower end adapted to be forced forwardly by said lay, means on said housing and shaft to transmit and translate forward movement of said actuating arm into axially forwardly sliding and rotative movement of said shaft and movable shearing arm, means, comprising relatively movable arcuate lips on the housing and disc, one of said lips having an end projecting arcuately outwardly therefrom adapted to overlap said other lip on rotation thereof, for gathering and gripping the weft thread into a serration of said stationary shearing edge prior to final shearing movement of said movable shearing edge and spring means mounted within said housing to return said shaft and movable shearing edge to starting position and buffer spring means mounted on the front end of said shaft to cushion the forward movement of said actuating arm relative to said shaft.

10. A weft shear for a loom having a lay and a temple having a head comprising a housing adapted to be secured to and abut the outer end of said temple head, a shaft rotatably mounted within said housing, a movable shearing member mounted on the rear end of said shaft and having an arm projecting radially outwardly therefrom terminating at a substantial distance from said shaft in a partially cylindrical shearing end bent at right angles rearwardly from the end thereof and having a shearing edge on the lower surface thereof inclined upwardly from rear to front, a partially cylindrical shearing member of substantially equal radius rigidly mounted on said housing having a rear shearing edge of substantially the radius of and immediately inside of said movable shearing edge and substantially adjacent the temple head rear edge and the edge of the warp and in front of and normal to the path of the weft and inclined upwardly from rear to front at a lesser angle than said movable shearing edge, an actuating arm having an upper end pivotally mounted on the front end of said housing having a portion engaging said shaft and a lower end adapted to be forced forwardly by said lay, means on said housing and shaft to transmit and translate forward movement of said actuating arm into rotative movement of said shaft and shearing arm, means comprising relatively movable arcuate lips on the housing and disc, one of said lips having an end projecting arcuately radially therefrom adapted to overlap said other lip on rotation thereof for gathering and gripping the weft thread against said stationary shearing edge prior to final shearing movement of said movable shearing edge and spring means mounted within said housing to return said shaft and movable shearing edge to starting position.

11. A weft shear for a loom having a lay and a temple having a head comprising a shaft rotatably mounted adjacent the front end of said temple head, a movable shearing member mounted on the rear end of said shaft and having an arm projecting radially outwardly therefrom terminating at a substantial distance from said shaft in a partially cylindrical shearing end bent at right angles rearwardly from the end thereof and having a shearing edge on the lower surface thereof inclined upwardly from rear to front, a rigidly mounted partially cylindrical shearing member of substantially equal radius, having a rear shearing edge of substantially the radius of and immediately inside of said movable shearing edge and substantially adjacent the temple head rear edge and the edge of the warp and in front of and normal to the path of the weft, an actuating arm pivotally mounted adjacent the front end of said shaft having a portion engaging said shaft and a lower end adapted to be forced forwardly by said lay, means to transmit and translate forward movement of said actuating arm into rotative movement of said shaft and shearing arm and means to return said shaft and movable shearing edge to starting position.

12. A weft shear for a loom having a lay and a temple having a head comprising a housing adapted to be secured to and abut the outer end of said temple head, a shaft axially slidably mounted within said housing, a movable shearing member mounted on the rear end of said shaft, comprising a disc spaced in inoperative position a distance from the housing rear end and having an arm projecting radially outwardly therefrom terminating at a substantial distance from said shaft in a partially cylindrical shearing end bent at right angles rearwardly from the end thereof and having a shearing edge on the lower surface thereof inclined upwardly from rear to front, a partially cylindrical shearing member of substantially equal radius rigidly mounted on said housing having a rear shearing edge of substantially the radius of and immediately inside of said movable shearing edge substantially adjacent the temple head rear edge and the edge of the warp and in front of and normal to the path of the weft, an actuating arm having an upper end pivotally mounted on the front end of said housing, having a center portion engaging said shaft and a lower end adapted to be forced forwardly by said lay, means on said housing and shaft to transmit forward movement of said actuating arm into axially forwardly sliding movement of said shaft and shearing arm, means comprising relatively movable arcuate lips on the housing and disc, one of said lips having an end projecting arcuately radially therefrom adapted to overlap said other lip on rotation thereof for gathering and gripping the weft thread against said stationary shearing edge prior to final shearing movement of said movable shearing edge and spring means mounted within said housing to return said shaft and movable shearing edge to starting position.

13. A weft shear for a loom having a lay and a temple having a head comprising a shaft axially slidably mounted adjacent the front end of said temple head, a movable shearing member mounted on the rear end of said shaft, comprising an arm projecting radially outwardly therefrom terminating at a substantial distance from said shaft in a partially cylindrical shearing end bent at right angles rearwardly from the end thereof and having a shearing edge on the lower surface thereof inclined upwardly from rear to front, a rigidly mounted partially cylindrical shearing member of substantially equal radius having a straight rear shearing edge of substantially the radius of and immediately inside of said movable shearing edge substantially adjacent the temple head rear edge and the edge of the warp and in front of and normal to the path of the weft, an actuating arm pivotally mounted adjacent the front end of said shaft having a portion engaging said shaft and a lower end adapted to be forced forwardly by said lay, means to transmit forward movement of said actuating arm into axially forwardly sliding movement of said shaft and shearing arm and means to return said shaft and movable shearing edge to starting position.

14. A weft shear for a loom having a lay and a temple having a head comprising a housing adapted to be secured to and abut the outer end of said temple head, a shaft axially slidably and rotatably mounted within said housing, a movable shearing member mounted on the rear end of said shaft, comprising a disc spaced in inoperative position a distance from the housing rear end and having an arm projecting radially outwardly therefrom terminating at a substantial distance from said shaft in a partially cylindrical shearing end bent at right angles rearwardly from the end thereof and having a shearing edge on the lower surface thereof inclined upwardly from the rear to front, a partially cylindrical shearing member of substantially equal radius rigidly mounted on said housing having a rear shearing edge, of substantially the radius of and immediately adjacent said movable shearing edge and substantially adjacent the temple head rear edge and the edge of the warp and in front of and normal to the path of the weft, an actuating arm having an upper end pivotally mounted on the front end of said housing, having a center portion engaging said shaft and a lower end adapted to be forced forwardly by said lay, means on said housing and shaft to transmit and translate forward movement of said actuating arm into axially forwardly sliding and rotative movement of said shaft and shearing arm, means for gathering and gripping the weft thread against said stationary shearing edge prior to final shearing movement of said movable shearing edge and means to return said shaft and movable shearing edge to starting position.

15. A weft shear for a loom having a lay and a temple having a head comprising a shaft axially slidably and rotatably mounted adjacent the front end of said temple head, a movable shearing member mounted on the rear end of said shaft, comprising an arm projecting radially outwardly therefrom terminating at a substantial distance from said shaft in a partially cylindrical shearing and bent at right angles rearwardly from the end thereof and having a shearing edge on the lower surface thereof, inclined upwardly from the rear to front, a rigidly mounted partially cylindrical shearing member of substantially equal radius, having a rear shearing edge, of substantially the radius of and immediately adjacent said movable shearing edge and substantially adjacent the temple head rear edge and the edge of the warp and in front of and normal to the path of the weft, an actuating arm pivotally mounted adjacent the front end of said shaft, having a portion engaging said shaft and a lower end adapted to be forced forwardly by said lay, means to transmit and translate forward movement of said actuating arm into axially forwardly sliding and rotative movement of said shaft and shearing arm and means to return said shaft and movable shearing edge to starting position.

16. A weft shear for a loom having a lay and a temple having a head comprising a shaft axially slidably and rotatably mounted adjacent the front end of said temple head, a movable shearing member mounted on the rear end of said shaft, comprising an arm projecting radially outwardly therefrom terminating at a substantial distance from said shaft in a partially cylindrical shearing end bent at right angles rearwardly from the end thereof and having a shearing edge on the lower surface thereof, inclined upwardly from the rear to front, a rigidly mounted partially cylindrical shearing member of substantially equal radius adjustable relative to said movable shearing edge, having a rear shearing edge, of substantially the radius of and immediately adjacent said movable shearing edge and substantially adjacent the temple head rear edge and the edge of the warp and in front of and normal to the path of the weft, an actuating arm pivotally mounted adjacent the front end of said shaft, having a portion engaging said shaft and a lower end adapted to be forced forwardly by said lay, means to transmit and translate forward movement of said actuating arm into axially forwardly sliding and rotative movement of said shaft and shearing arm and means to return said shaft and movable shearing edge to starting position.

17. A weft shear for a loom having a lay and a temple having a head comprising a housing adapted to be secured to and abut the outer end of said temple head, a shaft axially slidably and rotatably mounted within said housing, a movable shearing member mounted on the rear end of said shaft, comprising an arm projecting radially outwardly therefrom terminating at a substantial distance from said shaft in a partially cylindrical shearing end bent at right angles rearwardly from the end thereof and having a shearing edge on the lower surface thereof, a partially cylindrical shearing member of substantially equal radius rigidly mounted on said housing having a rear shearing edge of substantially the radius of and immediately adjacent said movable shearing edge and substantially adjacent the temple head rear edge and the edge of the warp and in front of and normal to the path of the weft, an actuating arm pivotally mounted on the front end of said housing having a portion engaging said shaft and a lower end adapted to be forced forwardly by said lay, cooperating screw means on said housing and shaft to transmit and translate forward movement of said actuating arm into an oblique relative movement of said movable shearing edge past said stationary shearing edge and means to return said shaft and movable shearing edge to starting position.

18. A weft shear for a loom having a lay and a temple having a head comprising a housing adapted to be secured to and abut the outer end of said temple head, a shaft axially slidably and rotatably mounted within said housing, a movable shearing member mounted on the rear end of said shaft, comprising an arm projecting radially outwardly therefrom terminating at a substantial distance from said shaft in a partially cylindrical shearing and bent at right angles rearwardly from the end thereof and having a shearing edge on the lower surface thereof inclined upwardly from the rear to front, a partially cylindrical shearing member of substantially equal radius rigidly mounted on said housing having a rear shearing edge, having a serrated edge at the inner edge thereof and a shearing edge at the outer edge thereof and a groove between said serrated and cutting edges and of substantially the radius of and immediately adjacent said movable shearing edge and substantially adjacent the temple head rear edge and the edge of the warp and in front of and normal to the path of the weft, an actuating arm having a portion engaging said shaft and a lower end adapted to be forced forwardly by said lay, means on said housing and shaft to transmit and translate forward movement of said actuating arm into axially forwardly sliding and rotative movement of said shaft and shearing arm and means to return said shaft and movable shearing edge to starting position.

19. A weft shear for a loom having a lay for use adjacent a warp edge for shearing the laid weft thread on the forward movement of said lay comprising a pair of shear blades having shearing edges arranged to remain throughout use at the same angle to each other mounted adjacent the warp edge and immediately adjacent and at an angle to the laid weft thread and means arranged to be actuated by the forward movement of said lay to relatively and simultaneously move said shear blades in shearing relation in a single direction at an angle to the laid weft thread and in another single direction at an angle to said first direction across said thread to shear said thread in both said directions.

20. A weft shear for a loom having a lay for use in the loom adjacent a warp edge for shearing the laid weft thread on the forward movement of said lay, comprising a pair of shear blades having shearing edges adjacent the warp edge and immediately adjacent and at an angle to and on different sides of the laid weft thread, one of said blades being movable across said laid weft thread relatively past the other and one of said blades being arranged to be continuously inclined at the same angle relative to the other blade in use and means arranged to be actuated by said lay and connected with said movable blade to move said movable blade both rotatively and rectilinearly at a constant angle obliquely across said thread and stationary blade.

ROBERT STEVENSON.